United States Patent [19]

Noguchi et al.

[11] Patent Number: 4,887,230
[45] Date of Patent: Dec. 12, 1989

[54] CURSOR DISPLAY APPARATUS

[75] Inventors: Yasuhiro Noguchi; Hitoshi Yamada, both of Hitachi; Yukio Funyu, Kitaibaraki, all of Japan

[73] Assignees: Hitachi, Ltd., Tokyo; Hitachi Process Computer Engineering, Inc., Hitachi, both of Japan

[21] Appl. No.: 156,847

[22] Filed: Feb. 17, 1988

[30] Foreign Application Priority Data

Feb. 18, 1987 [JP] Japan .................................. 62-33424

[51] Int. Cl.$^4$ .................... G06F 3/033; G06F 15/20
[52] U.S. Cl. .................................... 364/560; 340/709; 340/710; 364/521; 364/709.11
[58] Field of Search ............... 340/709, 710; 364/521, 364/522, 560, 561, 709.11

[56] References Cited

U.S. PATENT DOCUMENTS

| | | | |
|---|---|---|---|
| 4,580,006 | 4/1986 | Hull | 340/709 |
| 4,686,329 | 8/1987 | Joyce | 340/710 |
| 4,688,933 | 8/1987 | Lapeyre | 340/710 |
| 4,734,685 | 3/1988 | Watanabe | 340/710 |
| 4,751,507 | 6/1988 | Hama et al. | 340/709 |
| 4,763,116 | 8/1988 | Eichholz | 340/710 |

FOREIGN PATENT DOCUMENTS 60-126694 7/1985 Japan .
61-2951 1/1986 Japan .

Primary Examiner—Parshotam S. Lall
Assistant Examiner—Kevin J. Teska
Attorney, Agent, or Firm—Antonelli, Terry & Wands

[57] ABSTRACT

The movement volumes of X and Y to the X axial direction and the Y axial direction and the rotate angle $\theta$ of the coordinate input device moved on the substrate, are calculated by the input controller. The calculating device outputs instruction signals to the display device to move the cursor displayed on the display device by the movement volumes of X and Y, and rotate the cursor by the rotation angle corresponding to that calculated by the input controller.

2 Claims, 10 Drawing Sheets

CURSOR DISPLAY APPARATUS

FIELD OF THE INVENTION

The present invention relates to a cursor display apparatus for an engineering work station, such as used for computer aided design (CAD), or computer aided engineering (CAE), etc., more specifically; the present invention relates to a cursor display apparatus which is useful for a cursor display a drawing system, etc. which requires an accurate pointing function using a coordinate input device.

BACKGROUND OF THE INVENTION

A cursor display apparatus for displaying a cursor on a display device using an input device has been disclosed, for instance, in FIGS. 2 and 3 of Japanese Patent Laid-Open No. 60-126694 published on July 6, 1985, entitled "Cursor Display Method in Graphic Display", in which the overall image displayed on the display device is divided into several regions, and the direction of the cursor is changed in each divided region. However, the method gives no consideration as to how to change the direction of the cursor display for fine adjustment of the direction of the cursor in an arbitrary region of the display device.

Further, in FIG. 3 of Japanese Patent Publication No. 61-2951 published on Jan. 29, 1986, entitled "Cursor Control Circuit", there is provided a cursor display apparatus including means for moving the cursor by a predetermined amount. However, the circuit provides no way for an operation to fine adjust the cursor while watching the displayed image.

The prior art circuits have a drawback in that they do not provide for easy fine adjustment of the direction of pointing of the cursor, since the cursor is displayed only in one direction in the whole region or the divided region of the display device, and the cursor is not rotatable on the display device.

When it is required to move a cross hair cursor on a display device to a point positioned along a declined line connecting two predetermined points, prior art circuits can not perform such a function, although the cross hair cursor of the prior art can move in a horizontal or perpendicular direction on the display device.

SUMMARY OF THE INVENTION

An object of the present invention is to provide a cursor display apparatus which makes it easy to operate the cursor displayed on a display device by moving and rotating the cursor thereon.

The object of the present invention is achieved in such a manner that the cursor displayed on the display device can be moved and rotated in accordance with movement and rotation outputs of a coordinate input device on a surface.

When an operator moves and rotates the coordinate input device or pushes a button mounted on the coordinate input device, the cursor or the cross hair cursor displayed on the display device can be moved and rotated easily and finely on the display device, as apparent from the following detailed explanation of various exemplary embodiments.

DETAILED DESCRIPTION OF THE PREFERRED EMBODIMENTS

Figure 1:
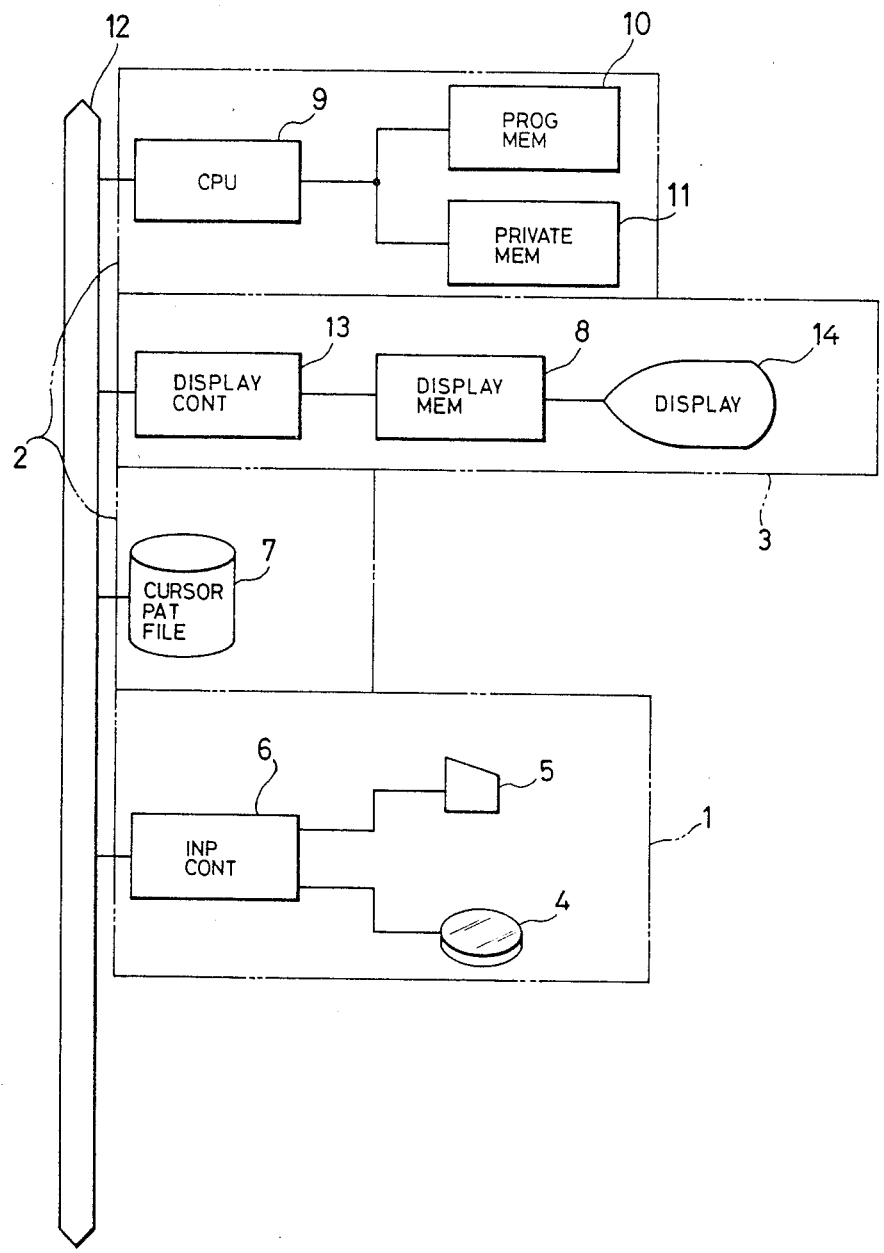
FIG. 1 is a diagram showing one embodiment of a cursor display apparatus of the present invention.

Referring to FIG. 1, 1 denotes an input device, 2 a calculating device, and 3 a display device. The input device 1 comprises a coordinate input device 4 for outputting more than two coordinate values, a key board 5, and an input controller 6. As seen as in FIG. 3, the input controller 6 has a movement amount detecting circuit 61, and a revolution amount detecting circuit 62. The calculating device 2 comprises a CPU 9, a program memory 10 having a cursor display control program, a private memory 11 having a present cursor pattern buffer which stores the newest information of the cursor pattern, and a cursor pattern file 7 having a cursor pattern table. The display device 3 comprises a display controller 13, a display memory 8, and the display device 14. The coordinate input device 4 and the key board 5 are connected to the input controller 6. The input controller 6 is connected to a system bus 12. The system bus 12 is also connected to the cursor pattern file 7, the display controller 13, and the CPU 9. The display controller 13 is connected to the display device 14 via the display memory 8. The CPU 9 is connected to the program memory 10 and the private memory 11.

Figure 2A:
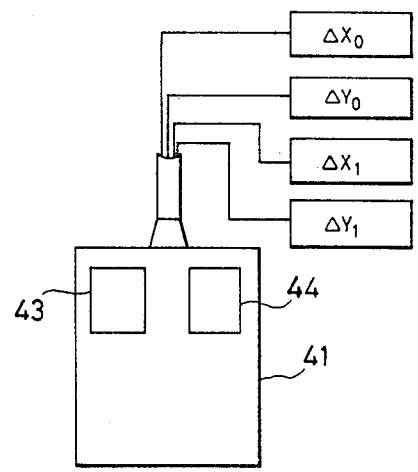
FIGS. 2A, 2B, and 2C are explanation diagrams showing one embodiment of the coordinate input device shown in FIG. 1.
Figure 2B:
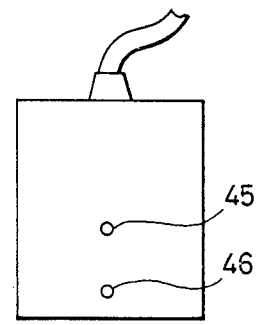
Figure 2C:
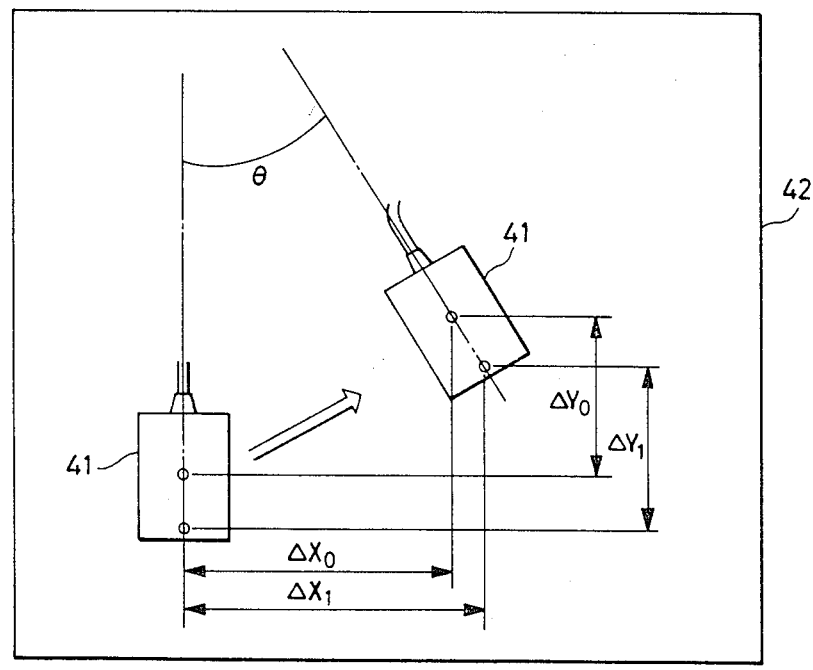
Figure 3:
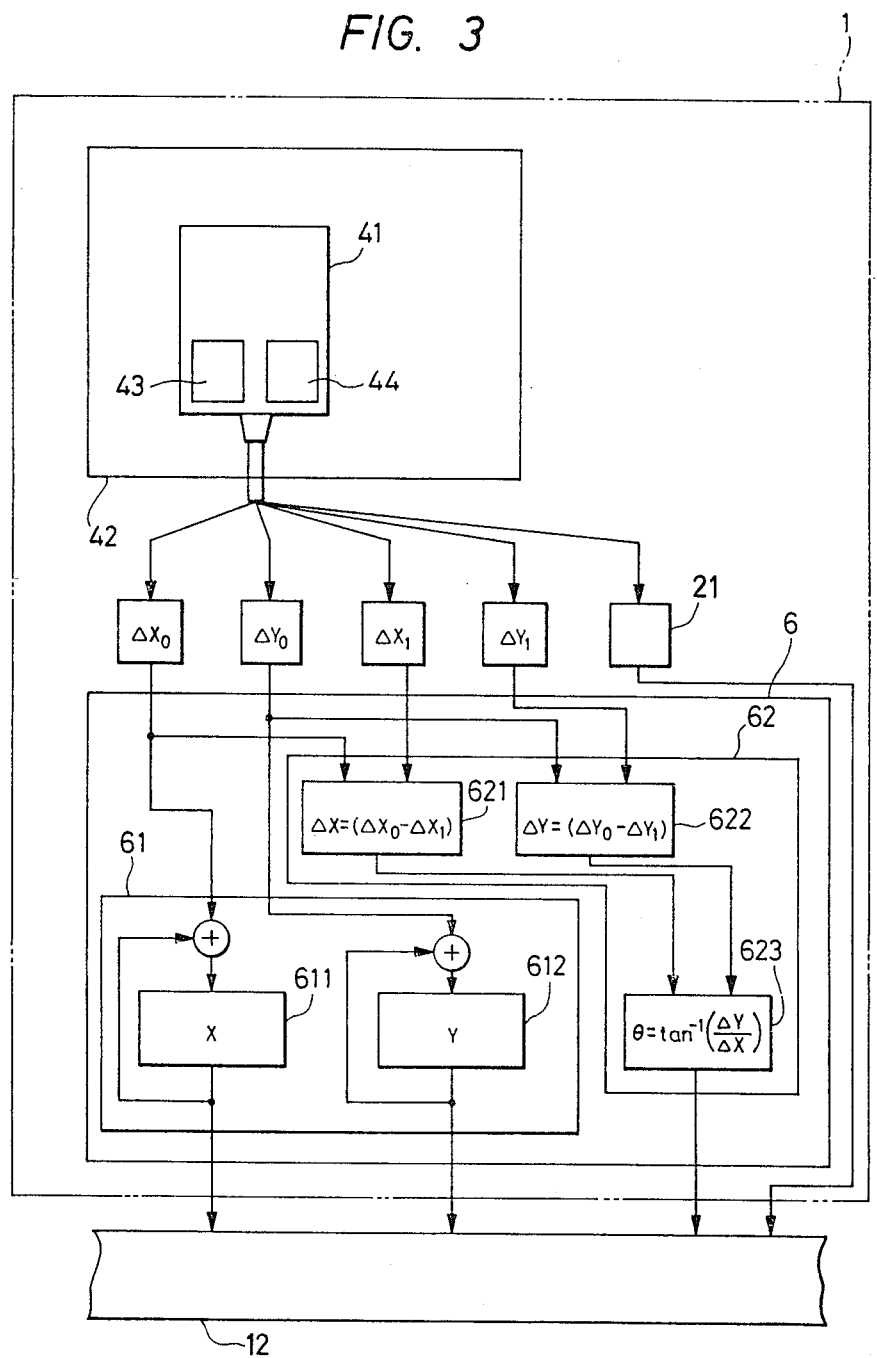
FIG. 3 is a diagram for explaining one embodiment of an input controller shown in FIG. 1.

FIG. 2A shows a front view of the coordinate input device 4. FIG. 2B shows a rear view of the coordinate input device 4. FIG. 2C is a drawing for explaining the movement of a mouse 41 as the coordinate input device 4 on a surface 42. 43 is a button mounted on the mouse 41 for pointing to a picture image on the display device 14. 44 is a button mounted on the mouse 41 for adjusting the rotation angle according to the method to be explained later with reference to FIGS. 9A, 9B, and 9C. 45 and 46 are sensors for detecting the magnitude of movement mechanically or optically between two points by a method to be explained below. The first movement detect sensor 45 is used for detecting the movements $\Delta X_o$, and $\Delta Y_o$ corresponding to the extent of movement of the coordinate input device 41 on the surface 42. The second movement detecting sensor 46 is provided in addition to the first sensor 45 for detecting the movements $\Delta X_1$, and $\Delta Y_1$ for detecting the rotational angle $\theta$ of the coordinate input device 41 on the surface 42. The coordinate input device 41 has five signal wires for outputting the first movements $\Delta X_o$ and $\Delta Y_o$ in the X and Y axial directions detected by the first movement detect sensor 45, the second movements $\Delta X_1$ and $\Delta Y_1$ in the X and Y axial directions detected by the second movement detect sensor 46, and a signal component 21 showing either output signal from the button 43 or 44 which is output as shown in FIG. 3. When the coordinate input device 41 is moved on the surface 42 in the direction of the arrow as shown in FIG. 2C, the movement $\Delta X_o$, $\Delta Y_o$, $\Delta X_1$, and $\Delta Y_1$ detected by the two kinds of the movement detect sensors 45 and 46 are input to the input controller 6, respectively.

Referring to FIG. 3, the input controller 6 comprises a movement detecting circuit 61 and a rotation detecting circuit 62. The movement detecting circuit 61 comprises a X axial direction cursor movement calculating circuit 611 and a Y axial direction cursor movement calculating circuit 612. The rotation detecting circuit 62 comprises a X axial direction deviation calculating circuit 621, a Y axial direction deviation calculating circuit 622 and a rotation calculating circuit 623. When the movement amount $\Delta X_o$, $\Delta Y_o$, $\Delta X_1$, and $\Delta Y_1$ are input to the input controller 6 from the coordinate input device 41, the movement amount $\Delta X_o$ and $\Delta Y_o$ are input to the movement detecting circuit 61 of the input controller 6, and the movement amount $\Delta X_o$, $\Delta Y_o$, $\Delta X_1$, and $\Delta Y_1$ are input to the rotation detecting circuit 62. The X axial direction cursor movement calculating circuit 611 and the Y axial direction cursor movement calculating circuit 612 of the movement detecting circuit 61 calculate the amount of cursor movement X and Y displayed on the display device 14 corresponding to the amount of movement of $\Delta X_o$ and $\Delta Y_o$ of the coordinate input device 41 on the surface 42, respectively. The rotation detecting circuit 62 calculates deviations of $\Delta X$ and $\Delta Y$ of the X and Y axial directions corresponding to the amounts of movement of $\Delta X_o$, $\Delta X_1$, $\Delta Y_o$, and $\Delta Y_1$ of the coordinate input device 41 on the surface 42 using the X axial direction deviation calculating circuit 621 and the Y axial direction deviation calculating circuit 622, using the following formulae;

$$\Delta X = \Delta X_o - \Delta X_1 \quad (1)$$

$$\Delta Y = \Delta Y_o - \Delta Y_1 \quad (2).$$

The rotation value calculating circuit 623 calculates a rotation angle $\theta$ corresponding to the deviations $\Delta X$ and $\Delta Y$ of the coordinate input device 41 on the substrate 42, using the following formula;

$$\theta = \tan^{-1}(\Delta Y / \Delta X) \quad (3).$$

The obtained cursor movement amounts X, Y and the rotation angle $\theta$ are transmitted to the CPU 9 via the system bus 12.

Figure 4:
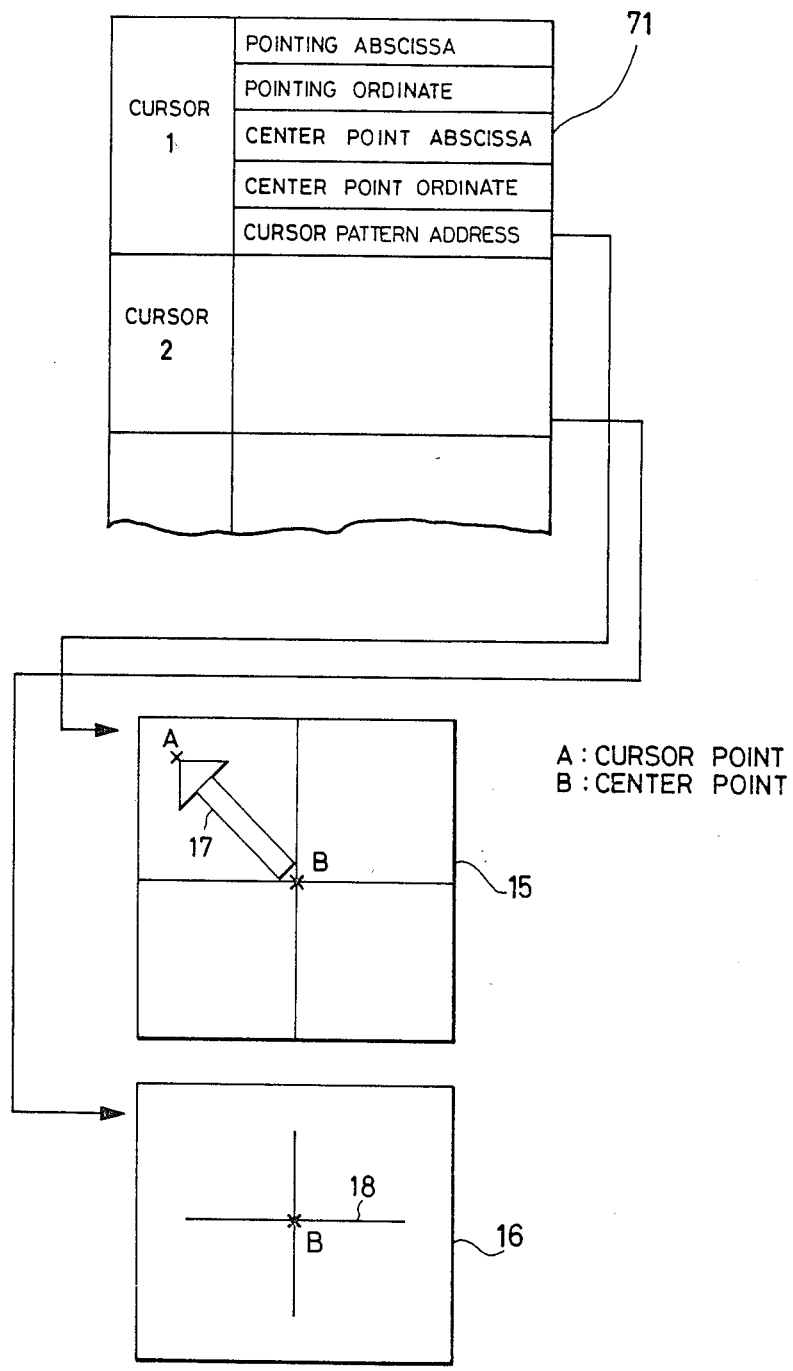
FIG. 4 is a drawing for explaining a cursor pattern table of a cursor pattern file shown in FIG. 1.

Referring to FIG. 4, 71 denotes a cursor pattern table stored in the cursor pattern file 7. The cursor pattern 1 of the cursor pattern table 71, for instance, stores an abscissa and an ordinate of a cursor point A, an abscissa and an ordinate of a central point B, and a cursor pattern address of a cursor pattern, as shown by numeral 15. The cursor pattern 2 of the cursor pattern table 71, for instance, stores an abscissa and an ordinate of a center point B and a cursor pattern address of a cross hair cursor pattern as shown by numeral 16. In the same way, many kinds of cursor patterns are stored in the cursor pattern file 7.

Figure 5:
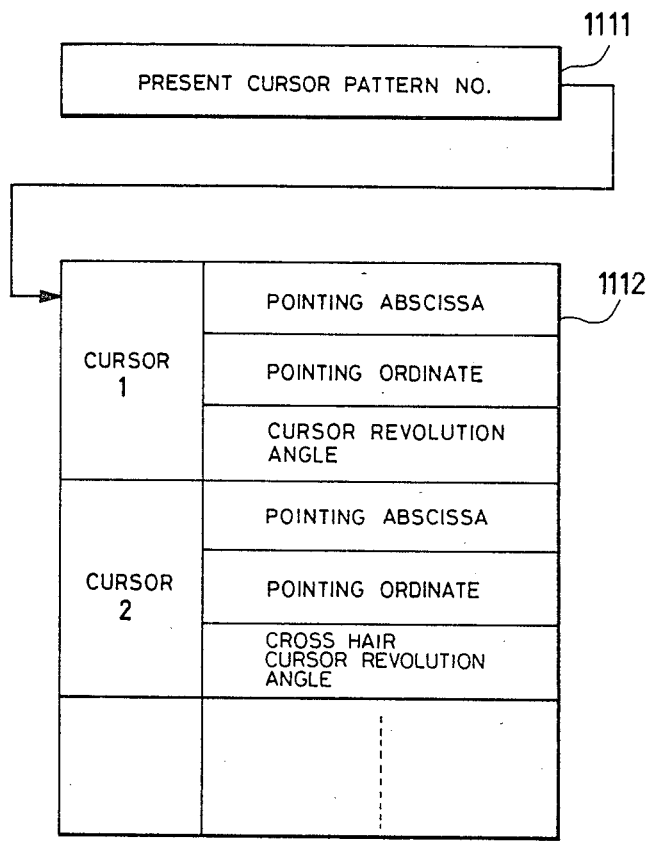
FIG. 5 is a drawing for explaining a private memory shown in FIG. 1.

FIG. 5 exemplifies cursor memories used for the private memory 11 shown in FIG. 1. In FIG. 5, 1111 denotes a present cursor pattern buffer, and 1112 represents a present cursor pattern table. The present cursor pattern buffer 1111 stores the cursor pattern No. shown in FIG. 4 corresponding to the cursor pattern used at the display device 14 at present. The table of the cursor 1 of the present cursor pattern table 1112, for instance, stores an abscissa, an ordinate of the cursor point and the cursor rotation angle which currently appear on the display. The table of the cursor 2 of the present cursor pattern table 1112, for instance, stores an abscissa, an ordinate of the central point of the cross hair cursor and the rotation angle of the cross hair cursor which currently appears on the display device.

Figure 6:
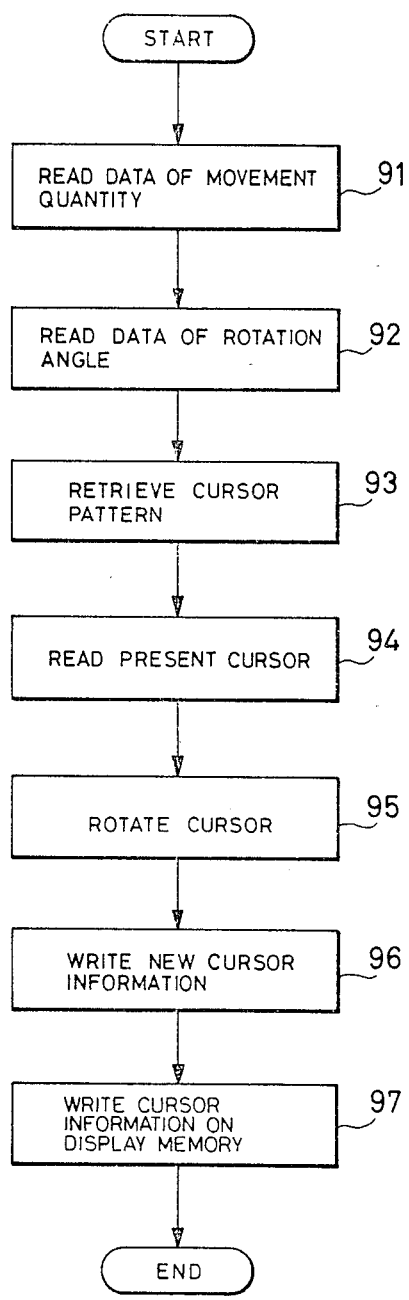
FIG. 6 shows a flow chart used for the cursor display by a CPU shown in FIG. 1.

Referring to FIG. 6, in steps 91, and 92, the CPU 9 reads from the input controller 6 the cursor movement amounts X, Y and the rotation angle $\theta$, as shown in FIG. 3, via the system bus 12, based on the movement amounts $\Delta X_o$, $\Delta Y_o$, $\Delta X_1$, and $\Delta Y_1$ from the coordinate input device 41, as shown in FIG. 2. In step 93, the CPU retrieves the present cursor pattern No. stored in the present cursor pattern buffer 1111.

Referring to step 94, the X ordinate, the Y abscissa of the present cursor pattern points and the present rotation angle from the original pattern stored at the cursor 1 position of the cursor pattern table 71 shown in FIG. 4 are read. In step 95, the cursor is rotated based on the rotation angle read in step 92 and the read data in the step 94. The data is written into the present private pattern table 1112 of the cursor memory 11 in step 96. At the same time, the location and orientation of the cursor pattern is written into the indicated position of the display memory 8 via the display controller 13 in step 97. The data written into the display memory 8 is displayed on the display device 14. In such a procedure, one cursor pattern displayed on the display device 14 can be rotated in all directions.

Figure 7A:
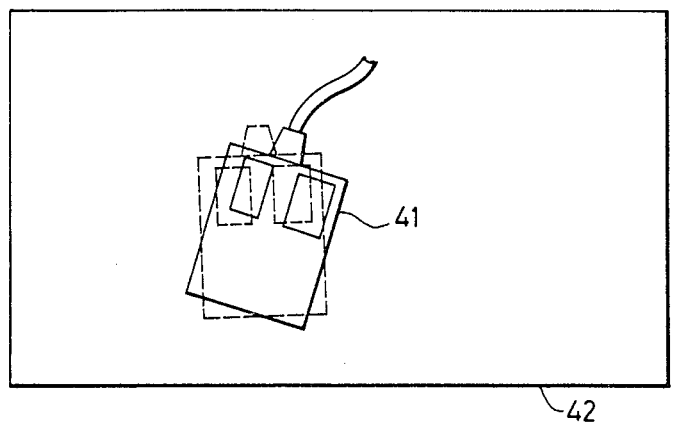
FIGS. 7A and 7B are drawings for explaining the display of an arrow cursor using the apparatus shown in FIG. 1.
Figure 7B:
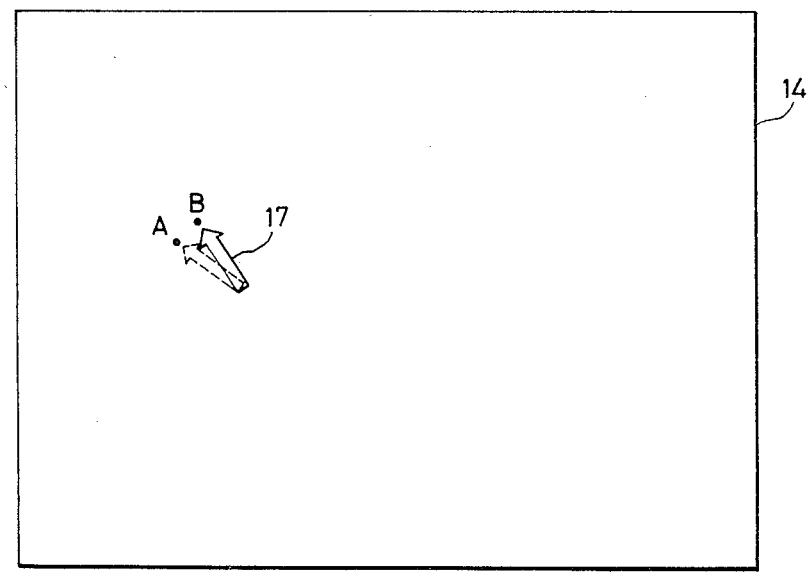

Referring to FIGS. 7A and 7B, when the coordinate input device 41 shown in FIG. 7A is rotated on the surface 42 from the dotted line position to the solid line position, the arrow cursor 17 displayed on the display device 14 shown in FIG. 7B is moved from the dotted line position which is pointing to point A to the solid line position which is pointing B located at the upper right side of the point A. In the prior art, such an adjustment of the direction of the cursor from the A point to the B point as shown in FIG. 7B has to be carried out in two operations for the upper direction and right direction, respectively, and vice versa for moving the cursor pointing direction from the A point to the B point. In the embodiment, the arrow cursor 17 can be adjusted finely from the A point to the B point only by rotating slightly the coordinate input device 41.

Figure 8A:
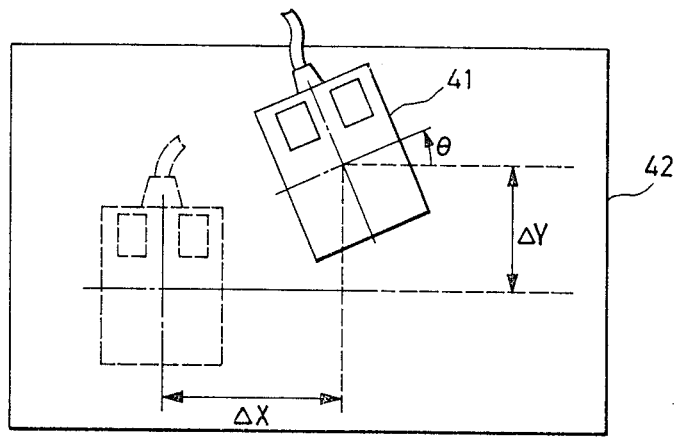
FIGS. 8A and 8B are drawings for explaining the display of a cross hair cursor using the apparatus shown in FIG. 1.
Figure 8B:
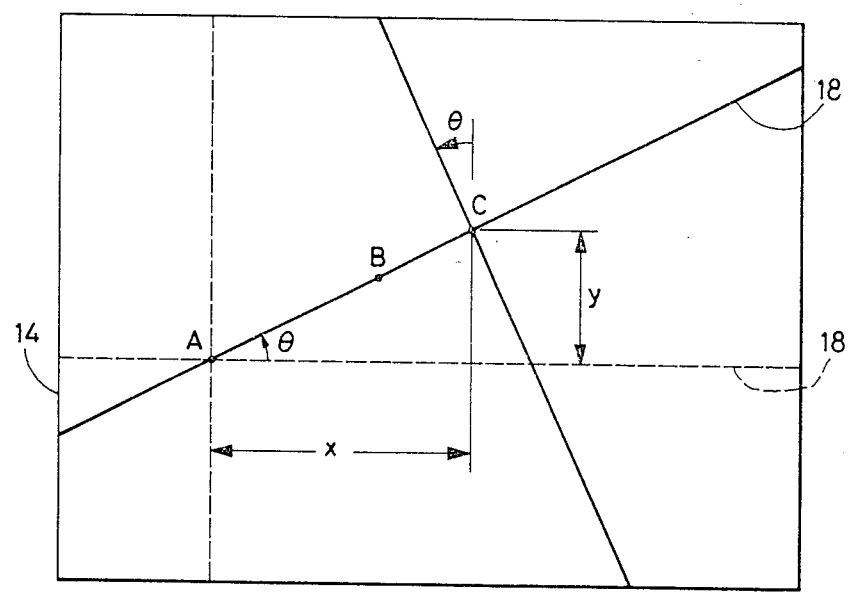

Referring to FIGS. 8A and 8B, when the coordinate input device 41 is moved from the dotted line position to the solid line position on the surface 42 by the movement amount $\Delta X$, $\Delta Y$, and the rotation angle $\theta$, the cross hair cursor 18 on the display device 14 shown in FIG. 8B moves from the intersection of the dotted lines of the X axial direction and the Y axial direction which has a cross point A to the intersection of the solid lines having a cross point C and a rotation angle $\theta$ which is located along a straight line connecting the A point and the B point, and has cursor movement amounts of X, Y, and rotation angle $\theta$. The embodiment is very useful when the new point C is extends along the straight line 18 connecting the A point and the B point.

Figure 9A:
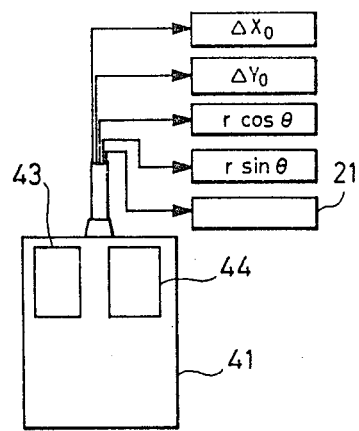
FIGS. 9A, 9B, 9C, and 9D are drawings for explaining other another embodiment of the coordinate input device shown in FIG. 1.
Figure 9B:
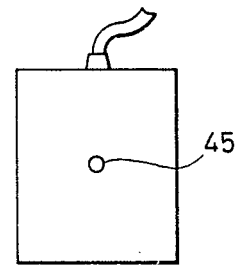
Figure 9C:
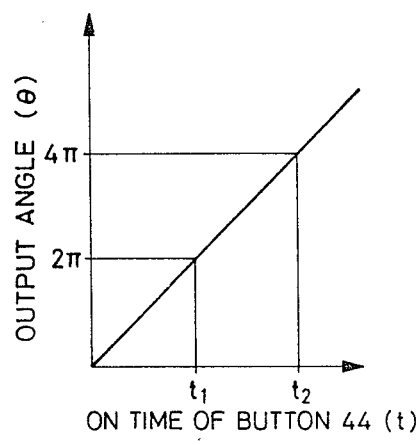
Figure 9D:
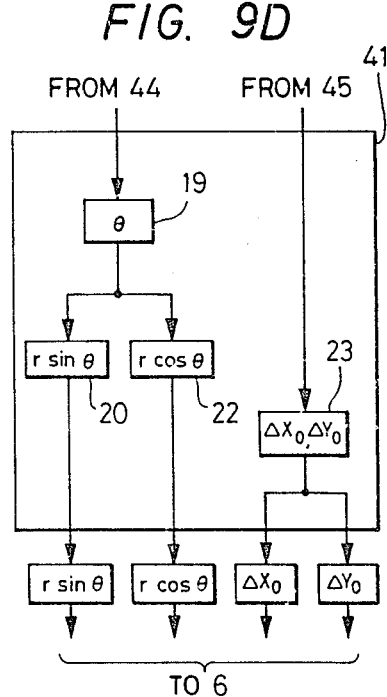

FIG. 9A shows a front view of the coordinate input device 4. FIG. 9B shows a rear view of the coordinate input device 4. FIG. 9C shows the relation between ON time of the button 44 and the output angle $\theta$. FIG. 9D shows a diagram for explaining the coordinate input device 41 shown in FIG. 9A. Although the coordinate input device 41 shown in FIG. 2B has two movement sensors 45, and 46, the coordinate input device 41 shown in FIG. 9B has one movement sensor 45. As shown in FIG. 9C, the button 44 of the coordinate input device has a function of outputting an output angle $\theta$ which is proportional to ON time of the button 44. For instance, when the button 44 is switched on during $t_1$ or $t_2$, the output angle $\theta$ is $2\pi$, or $4\pi$, respectively. When the coordinate input device 41 is moved on the surface 42, the amounts of movement $\Delta X_o$, and $\Delta Y$ detected by the movement sensor 45 are output from the $\Delta X_o$, and $\Delta Y_o$ generator 23. When the button 44 is pushed, $\theta$ output generator 19 outputs the output angle signal $\theta$, and r sin $\theta$ and r cos $\theta$ are output from the r sin $\theta$ function generator 20 and the r cos $\theta$ function generator 22, respectively. Wherein r is a constant. These signals of $\Delta X_o$, $\Delta Y_o$, r sin $\theta$, and r cos $\theta$ are input to the input controller 6. Based on the $\Delta X_o$, and $\Delta Y_o$, the X axial direction cursor movement amount X and the Y axial direction cursor movement amount Y are output from the calculating circuits 611, and 612, respectively, as shown in FIG. 3. The rotation angle $\theta$ is calculated by a division calculating circuit (not shown) of r sin $\theta$/r cos $\theta$, and a inverse tangent ($\tan^{-1}$) calculating circuit (not shown) of the output signal from the division circuit in the modified rotation volume detecting circuit 62 (not shown).

Figure 10A:
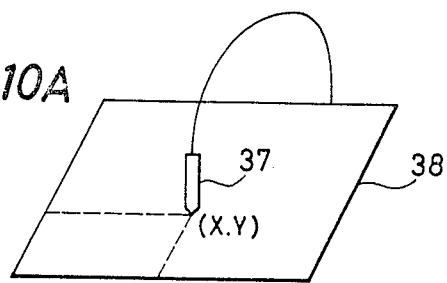
FIGS. 10A, 10B, and 10C are drawings for explaining another embodiment of the coordinate input device shown in FIG. 1.
Figure 10B:
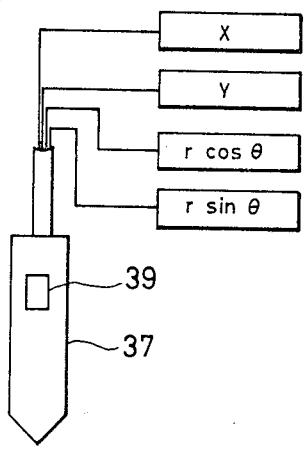
Figure 10C:
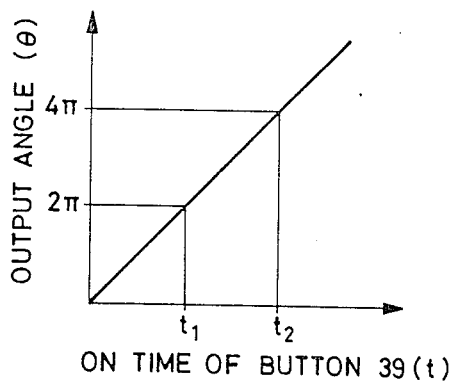

FIG. 10A is a perspective view of a tablet of the coordinate input device 3 as another embodiment. FIG. 10B is a front view of the tablet. FIG. 10C shows a relation between ON time t of the button 39 shown in FIG. 10B and output angle $\theta$. In FIGS. 10A and 10B, 37 is a tablet pen of the coordinate input device 3, and 38 a tablet substrate. The coordinate values of X and Y of the tablet substrate 38 are output from the tablet pen 37 corresponding to the position in which the tablet 37 is pushed to the substrate 38. When the tablet button 39 is switched ON, the coordinate values of r cos $\theta$ and r sin $\theta$ of the output angle $\theta$ are output corresponding to the ON time of the button 39. According to the tablet of the coordinate input device 4, the cursor display is possible as well as the mouse of the coordinate input device 41 shown in FIGS. 2A, 2B, 2C, and FIGS. 9A, 9B, 9C, 9D.

According to the present invention, since the cursor pattern can be displayed in all directions using one cursor pattern and the precise adjustment of the cursor pointing becomes easy, the cursor display apparatus of the present invention is improved in its operation.

What we claim is:

1. A cursor display apparatus for displaying a cursor for showing an input coordinate position on a display device, comprising:

a coordinate input device moveable on a surface for outputting coordinate values, in ordinate and abscissa directions, of a cursor position on said display device, including a first movement detecting sensor for detecting first movement amounts $\Delta Xo$, $\Delta Yo$ of said coordinate input device in horizontal and vertical directions corresponding to the extent of movement of the first movement detecting sensor on said surface, and a second movement detecting sensor for detecting second movement amounts $\Delta X1$, $\Delta Y1$, of said coordinate input device in horizontal and vertical directions corresponding to the extent of movement of the second movement detecting sensor on said surface;

an input controller coupled to said coordinate input device and having a first movement amount calculating circuit which calculates a cursor movement amount X in the abscissa direction on said display device based on the movement amounts $\Delta Xo$, $\Delta X1$ of said coordinate input device in the horizontal direction detected by said first movement detecting sensor, a second movement amount calculating circuit which calculates a cursor movement amount Y in the ordinate direction on said display device based on the movement amounts $\Delta Yo$, $\Delta Y1$, in the vertical direction detected by said second movement detecting sensor and a rotation amount calculating circuit which calculates a rotation angle $\theta$ of said cursor displayed on said display device based on the relationship $$\theta = \tan^{-1}\left(\frac{\Delta Y0 - \Delta Y1}{\Delta X0 - \Delta X1}\right)$$

and a calculating device coupled to said input controller for outputting to said display device cursor data based on said movement amounts X, Y and said rotation angle $\theta$ on said display device based on the output signals from said input controller.

2. A cursor display apparatus for displaying a cursor for showing an input coordinate position on a display device, comprising:

a coordinate input device moveable on a surface for outputting coordinate values, in ordinate and abscissa directions, of a cursor position on said display device, including a movement detecting sensor for detecting movement amounts $\Delta Xo$, $\Delta Yo$ of said coordinate input device in horizontal and vertical directions corresponding to the extent of movement of the movement detecting sensor on said surface, and an angle movement detector including a button for outputting a signal indicating an angle $\theta$ which is proportional to a time period during which the button is depressed;

an input controller coupled to said coordinate input device and having a first movement amount calculating circuit which calculates a cursor movement amount X in the abscissa direction on said display device based on the movement amount $\Delta Xo$ of said coordinate input device in the horizontal direction detected by said movement detecting sensor, a second movement amount calculating circuit which calculates a cursor movement amount Y in the ordinate direction on said display device based on the movement amount $\Delta Yo$ in the vertical direction detected by said second movement detecting sensor and a rotation amount calculating circuit which calculates a rotation angle $\theta'$ of said cursor displayed on said display device based on the relationship $$\theta' = \tan^{-1}\left(\frac{r \operatorname{din} \theta}{r \cos \theta}\right),$$

where r is a constant; and
a calculating device coupled to said input controller for outputting to said display device cursor data based on said movement amounts X, Y and said rotation angle $\theta'$ on said display device based on the output signals from said input controller.

* * * * *